(12) United States Patent
Ogle et al.

(10) Patent No.: US 10,798,443 B2
(45) Date of Patent: *Oct. 6, 2020

(54) SET-TOP BOX WITH ENHANCED CONTENT AND SYSTEM AND METHOD FOR USE OF SAME

(71) Applicant: Enseo, Inc., Richardson, TX (US)

(72) Inventors: Vanessa Ogle, Fairview, TX (US); Bill Fang, Plano, TX (US)

(73) Assignee: Enseo, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,756

(22) Filed: Dec. 4, 2018

(65) Prior Publication Data

US 2019/0110101 A1 Apr. 11, 2019

Related U.S. Application Data

(63) Continuation of application No. 15/583,166, filed on May 1, 2017, now Pat. No. 10,149,005, which is a
(Continued)

(51) Int. Cl.
*H04N 21/4363* (2011.01)
*H04N 21/41* (2011.01)
(Continued)

(52) U.S. Cl.
CPC ....... *H04N 21/43637* (2013.01); *G08C 17/02* (2013.01); *H04N 5/4403* (2013.01); *H04N 21/2143* (2013.01); *H04N 21/4126* (2013.01); *H04N 21/4131* (2013.01); *H04N 21/422* (2013.01); *H04N 21/4222* (2013.01); *H04N 21/42202* (2013.01); *H04N 21/42207* (2013.01); *H04N 21/42224* (2013.01); *H04N 21/4367* (2013.01); *H04N 21/4383* (2013.01); *H04W 4/023* (2013.01); *H04W 4/21* (2018.02); *G08C 2201/20* (2013.01); *G08C 2201/30* (2013.01); *G08C 2201/92* (2013.01);
(Continued)

(58) Field of Classification Search
CPC ......... H04N 21/43637; H04N 21/4126; H04N 21/4383; H04N 21/422; H04N 21/2143
See application file for complete search history.

(56) References Cited

U.S. PATENT DOCUMENTS 6,263,503 B1 7/2001 Margulis
6,640,337 B1 * 10/2003 Lu .......................... G06F 3/033
348/734
(Continued)

*Primary Examiner* — Oschta I Montoya
(74) *Attorney, Agent, or Firm* — Scott Griggs; Griggs Bergen LLP

(57) ABSTRACT

A set-top box with enhanced content and system and method for use of the same are disclosed. In one embodiment, a wireless transceiver is located within a housing, which also interconnectively includes a television input, television output, a processor, and memory. The set-top box may establish a pairing with a proximate wireless-enabled interactive programmable device having a display. The set-top box receives trajectory data from the proximate wireless-enabled interactive programmable device, which represents motion-based commands provided by a user. The set-top box evaluates the trajectory data and sends a command signal to the television.

18 Claims, 4 Drawing Sheets

Related U.S. Application Data continuation-in-part of application No. 15/422,667, filed on Feb. 2, 2017, now Pat. No. 10,187,685, which is a continuation of application No. 15/162,823, filed on May 24, 2016, now abandoned, which is a continuation of application No. 14/876,571, filed on Oct. 6, 2015, now Pat. No. 9,351,029, which is a continuation of application No. 14/525,392, filed on Oct. 28, 2014, now Pat. No. 9,154,825, which is a continuation of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 62/329,510, filed on Apr. 29, 2016, provisional application No. 61/498,734, filed on Jun. 20, 2011.

(51) Int. Cl.

| | | |
|---|---|---|
| *H04N 21/438* | (2011.01) | |
| *H04N 21/422* | (2011.01) | |
| *H04N 21/214* | (2011.01) | |
| *H04W 4/21* | (2018.01) | |
| *G08C 17/02* | (2006.01) | |
| *H04N 5/44* | (2011.01) | |
| *H04N 21/4367* | (2011.01) | |
| *H04W 4/02* | (2018.01) | |
| *H04W 4/80* | (2018.01) | |

(52) U.S. Cl.
CPC ... *G08C 2201/93* (2013.01); *H04N 2005/443* (2013.01); *H04N 2005/4425* (2013.01); *H04N 2005/4435* (2013.01); *H04W 4/80* (2018.02)

(56) References Cited

U.S. PATENT DOCUMENTS

| | | | |
|---|---|---|---|
| 6,741,684 | B2 | 5/2004 | Kaars |
| 7,109,974 | B2* | 9/2006 | Kempisty ............ H04N 5/4403 345/173 |
| 8,286,204 | B2 | 10/2012 | Fukuda et al. |
| 8,320,901 | B2* | 11/2012 | Klein ............... H04N 21/43615 455/420 |
| 8,650,600 | B2 | 2/2014 | Ogle et al. |
| 8,875,195 | B2 | 10/2014 | Ogle et al. |
| 10,149,005 | B2 | 12/2018 | Ogle et al. |
| 2002/0059621 | A1 | 5/2002 | Thomas et al. |
| 2002/0143805 | A1 | 10/2002 | Hayes et al. |
| 2003/0073411 | A1 | 4/2003 | Meade |
| 2005/0005297 | A1 | 1/2005 | Lee |
| 2005/0035846 | A1 | 2/2005 | Zigmond et al. |
| 2005/0097618 | A1 | 5/2005 | Arling et al. |
| 2005/0108751 | A1 | 5/2005 | Dacosta |
| 2005/0262535 | A1 | 11/2005 | Uchida et al. |
| 2008/0088602 | A1* | 4/2008 | Hotelling .............. G06F 1/1637 345/173 |
| 2008/0134256 | A1* | 6/2008 | DaCosta ............ H04N 7/17318 725/62 |
| 2009/0327894 | A1 | 12/2009 | Rakib |
| 2010/0082485 | A1 | 4/2010 | Lin et al. |
| 2010/0082491 | A1 | 4/2010 | Rosenblatt et al. |
| 2010/0188279 | A1 | 7/2010 | Shamilian et al. |
| 2011/0007018 | A1 | 1/2011 | McKinley et al. |
| 2011/0067059 | A1 | 3/2011 | Johnston et al. |
| 2012/0227077 | A1* | 9/2012 | Spivack .............. G06F 16/9535 725/110 |
| 2016/0150263 | A1* | 5/2016 | Patino ................ H04N 21/4182 725/25 |

\* cited by examiner

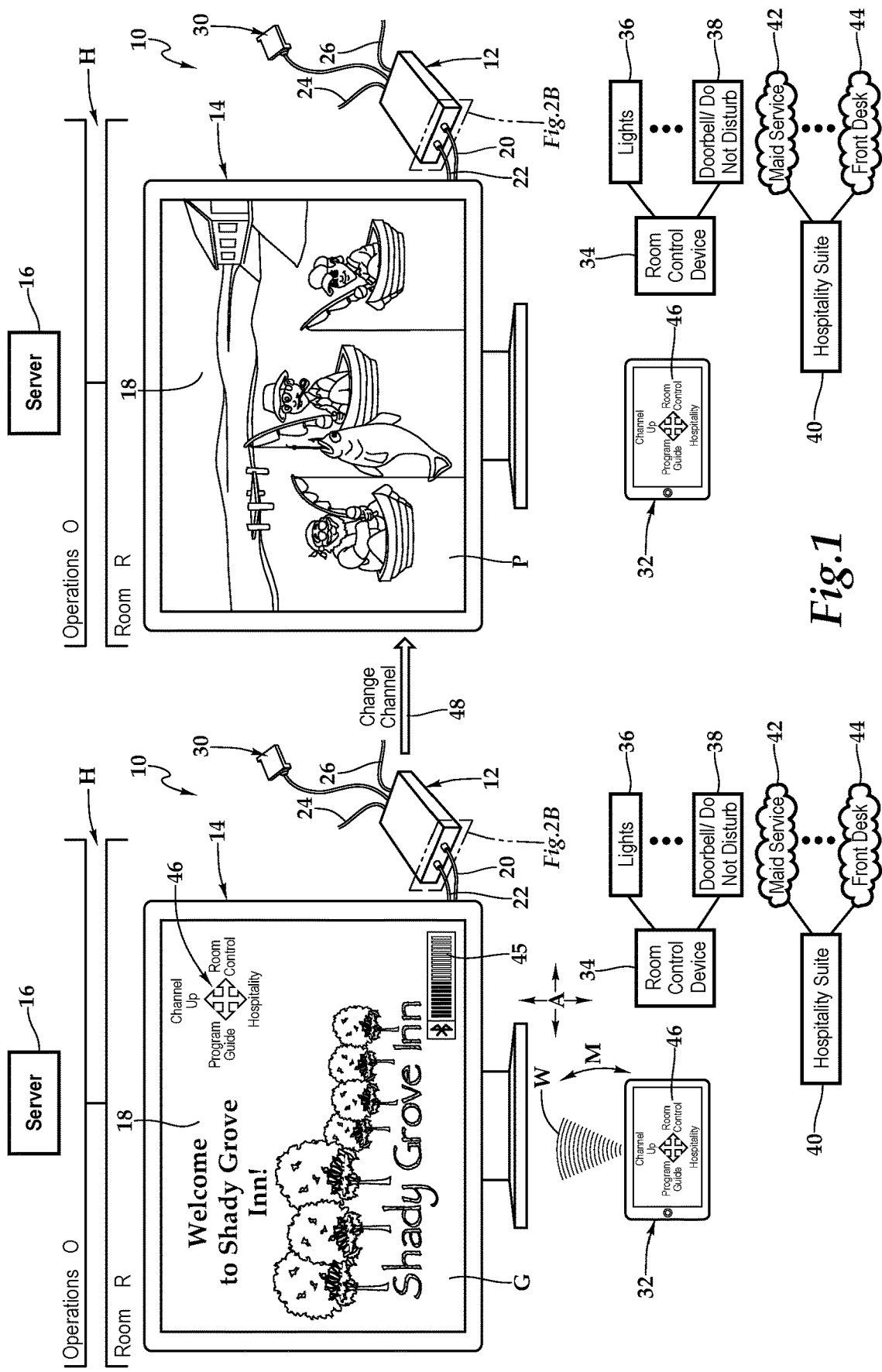

SET-TOP BOX WITH ENHANCED CONTENT AND SYSTEM AND METHOD FOR USE OF SAME

PRIORITY STATEMENT & CROSS-REFERENCE TO RELATED APPLICATIONS

This application is a continuation of U.S. patent application Ser. No. 15/583,166 entitled "Set-Top Box with Enhanced Content and System and Method for Use of Same" filed on May 1, 2017, in the names of Vanessa Ogle et al., now U.S. Pat. No. 10,149,005 issued on Dec. 4, 2018; which claims priority from U.S. Patent Application Ser. No. 62/329,510 entitled "Set-Top Box with Enhanced Content and System and Method for Use of Same" filed on Apr. 29, 2016, in the names of Vanessa Ogle et al.; which is hereby incorporated by reference for all purposes herein. U.S. patent application Ser. No. 15/583,166 entitled "Set-Top Box with Enhanced Content and System and Method for Use of Same" filed on May 1, 2017, in the names of Vanessa Ogle et al., now U.S. Pat. No. 10,149,005 issued on Dec. 4, 2018 is also a continuation-in-part of U.S. application Ser. No. 15/422,667 entitled "Set Top/Back Box, System and Method for Providing a Remote Control Device" filed on Feb. 2, 2017, in the names of Vanessa Ogle et al.; which is a continuation of U.S. patent application Ser. No. 15/162,823 entitled "Set Top/Back Box, System and Method for Providing a Remote Control Device" filed on May 24, 2016, in the names of Vanessa Ogle et al.; which is a continuation of U.S. patent application Ser. No. 14/876,571 entitled "Set Top/Back Box, System and Method for Providing a Remote Control Device" filed on Oct. 6, 2015, in the names of Vanessa Ogle et al., now U.S. Pat. No. 9,351,029 issued on May 24, 2016; which is a continuation of U.S. patent application Ser. No. 14/525,392 entitled "Set Top/Back Box, System and Method for Providing a Remote Control Device" filed on Oct. 28, 2014, in the names of Vanessa Ogle et al., now U.S. Pat. No. 9,154,825 issued on Oct. 6, 2015; which is a continuation of U.S. patent application Ser. No. 14/177,876 entitled "Set Top/Back Box, System and Method for Providing a Remote Control Device" filed on Feb. 11, 2014, in the names of Vanessa Ogle et al., now U.S. Pat. No. 8,875,195 issued on Oct. 28, 2014; which is a continuation of U.S. application Ser. No. 13/528,663 entitled "Set Top/Back Box, System And Method For Providing a Remote Control Device" filed on Jun. 20, 2012, in the names of Vanessa Ogle, et al., now U.S. Pat. No. 8,650,600 issued on Feb. 11, 2014; which claims priority from U.S. Patent Application Ser. No. 61/498,734 entitled "Set Top/Back Box, System and Method for Providing a Remote Control Device" and filed on Jun. 20, 2011, in the names of Vanessa Ogle et al.; all of which are hereby incorporated by reference for all purposes.

TECHNICAL FIELD OF THE INVENTION

This invention relates, in general, to set-top boxes and, in particular, to set-top boxes with enhanced content and systems and methods for use of the same that address and enhance the content typically received from an external signal source and provided to a television.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a set-top box that would improve upon existing limitations in functionality. It would also be desirable to enable a computer-based electronics and software solution that would provide enhanced content in an easy-to-use platform in the hospitality lodging industry or in another environment. To better address one or more of these concerns, a set-top box with enhanced content and system and method for use of the same are disclosed. In one embodiment of the set-top box, a wireless transceiver is located within a housing, which also interconnectively includes a television input, television output, a processor, and memory.

The set-top box may establish a pairing with a proximate wireless-enabled interactive programmable device having a display. The set-top box receives trajectory data from the proximate wireless-enabled interactive programmable device, which represents motion-based commands provided by a user. The set-top box evaluates the trajectory data and sends a command signal to the television. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is schematic diagram depicting one embodiment of a system for providing a set-top box having enhanced content thereon according to the teachings presented herein;

DETAILED DESCRIPTION OF THE INVENTION

Figure 2A:
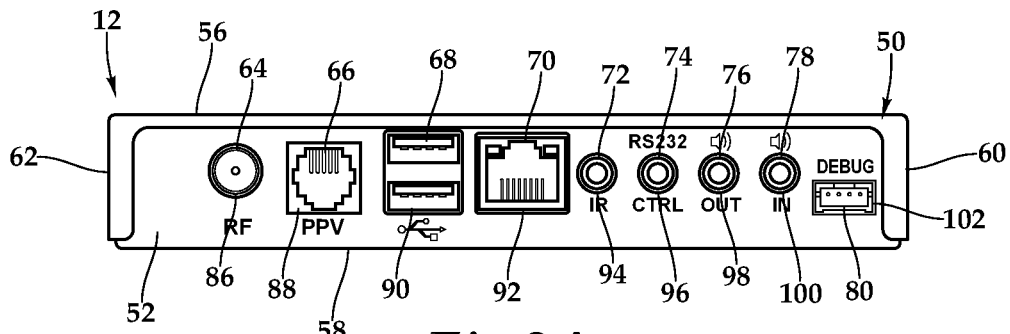
FIG. 2A is a wall-facing exterior elevation view of one embodiment of the set-top box depicted in FIG. 1 in further detail.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a system 10 utilizing set-top box 12 with enhanced content capabilities being employed within a hospitality lodging establishment H. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms, including room R and back of the house operations O. The set-top box 12 is communicatively disposed with various amenities associated with the hospitality environment H, including a television 14. Set-top boxes, like the set-top box 12, may be deployed throughout the rooms R of the hotel H and are in communication with a property server 16, which is co-located at the hotel H.

As shown, in one embodiment, within the room R, the system 10 includes the set-top box 12 and a display illustrated as the television 14 having a screen 18. A connection, which is depicted as an HDMI connection 20, connects the set-top box 12 to the television 14. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 includes a dongle 30 providing particular technology and functionality extensions thereto. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the television 14.

A proximate wireless-enabled interactive programmable device 32 may be a wireless-enabled interactive handheld device that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, an application installed from a server enables the set-top box 12 and the proximate wireless-enabled interactive programmable device 32 to be wirelessly paired. In another embodiment, a challenge-response is utilized to wirelessly pair the set-top box 12 and the proximate wireless-enabled interactive programmable device 32. A room control device 34 represents control of various amenities associated with a user's stay in a lodging establishment. The various amenities may include lights 36, a thermostat, shades, and a doorbell/do not disturb designation 38. The set-top box 12 is communicatively disposed with these various amenities, which may also include a CD/DVD player, a radio tuner, and a hospitality suite 40, which represents a set of services such as check in/check out, maid service 42, spa, room service, and front desk 44.

As shown, an interactive guest portal G is displayed on the television screen 18, which is generic, unless a guest configuration profile is loaded within the set-top box 12. The guest configuration profile may be loaded from the operations, e.g., the front desk or hotel headend, by use of a remote control, or by a proximate device, such as the proximate wireless-enabled interactive programmable device 32. The guest configuration profile personalizes the presentation of the guest portal G, as discussed below.

In one implementation, as illustrated, the set-top box 12 extends a physical authorization interface, shown as area A, from the set-top box to an area easily accessible to a transitory guest's convenience such as in front or side of the television 14. This physical authorization interface A may include a short range wireless data connection that is enabled only when very close physically to the proximate wireless-enabled interactive programmable device 32, for example. Further, once the pairing is established, as represented by bar 45, the set-top box 12 provides a secure wireless interface to communicate transitory guest user device authorization information to the set-top box 12 to accomplish verification. Once authorization information is communicated to the set-top box 12, the set-top box 12 enables the guest configuration profile.

Enabled, the guest configuration profile provides a customized set-top box experience. More particularly, the guest configuration profile includes guest identification, a guest channel preference presentation, and a guest service preference presentation with guest account information. The guest configuration profile is a guest-specific, guest-customized set-top box generated environment referencing an explicit digital representation of a guest's identity. The set-top box generates the interactive guest portal G, and various other menu options including a program guide, a guest channel preference presentation, a guest service preference presentation, a live television option, a plug-and-play option, and a local device option, which includes premium programming, game, and music content, for example. Further, personal area network and local area network connectivity is provided to the proximate wireless-enabled interactive programmable device 32, as shown by the Wi-Fi indicator W.

In operation, virtual remote control functionality may be provided by the proximate wireless-enabled interactive programmable device 32 by motion of the proximate wireless-enabled interactive programmable device 32 to (a) send a command signal to the television, (b) import content from the proximate wireless-enabled interactive programmable device to the television, or (c) control an amenity associated with a user's stay in a lodging establishment, for example. As shown in FIG. 1, the proximate wireless-enabled interactive programmable device 32 is prepared for motion-based commands and a visual indication of such is provided by way of icon 46, which may be presented on the screen 18 or on the proximate wireless-enabled interactive programmable device 32. Thereafter, motion-based commands M are received by the proximate wireless-enabled interactive programmable device 32 and forwarded to the set-top box 12. Once translated, a command is generated to change the channel, as shown by channel change 48, from the interactive guest portal G to program P.

Figure 2B:
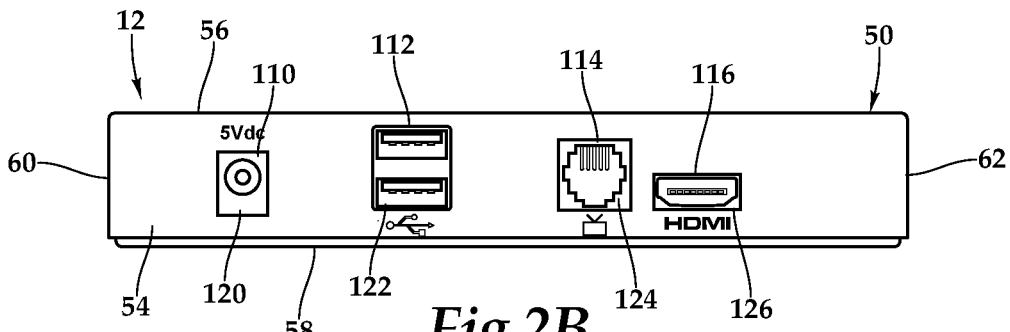
FIG. 2B is a television-facing exterior elevation view of the set-top box depicted in FIG. 2A.
Figure 2C:
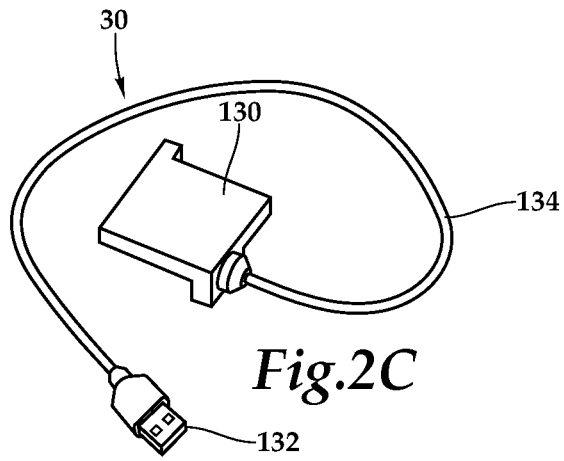
FIG. 2C is a front perspective view of one embodiment of a dongle depicted in FIG. 1 in further detail.
Figure 3:
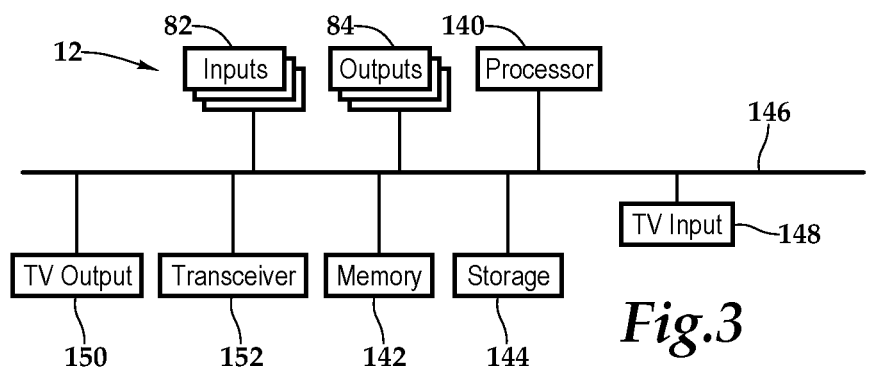
FIG. 3 is a functional block diagram depicting one embodiment of the set-top box presented in FIGS. 2A and 2B.

Referring to FIG. 2A, FIG. 2B, and FIG. 3, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, an RJ45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ45 coupling 124, and an HDMI port 126. It should be appreciated that the configuration of ports may vary with the set-top box depending on application and context. As previously alluded to, the housing 50 may include a housing-dongle combination including, with respect to the dongle 30, a unit 130 having a cable 134 with a set-top box connector 132 for selectively coupling with the set-top box 12.

Within the housing 50, a processor 140, memory 142, storage 144, the inputs 82, and the outputs 84 are interconnected by a bus architecture 146 within a mounting architecture. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. The various inputs 82 and outputs 84 provide connections to and from the computing device, wherein the inputs 82 are the signals or data received by the set-top box 12, and the outputs 84 are the signals or data sent from the set-top box 12.

A television content signal input 148 and a television output 150 are also secured in the housing 50 in order to receive content from a source in the hospitality property and forward the content, including external content such as cable and satellite and pay-per-view (PPV) programing, to the television located within the hotel room.

A transceiver 152 is associated with the set-top box 12 and communicatively disposed with the bus 146. As shown the transceiver 152 may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, Wi-Fi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. The processor-executable instructions specify a search operation to identify the proximate wireless-enabled interactive programmable device 32 wherein the search operation utilizes the wireless transceiver to wirelessly identify the proximate wireless-enabled interactive programmable device 32. The processor-executable instructions then establish a pairing between the proximate wireless-enabled interactive programmable device 32 and the set-top box 12. Following the establishment of a pairing, formatted parallel audiovisual experience instructions are sent to the proximate wireless-enabled interactive programmable device 32. The formatted parallel audiovisual experience instructions are configured to provide a downstream parallel experience related to the content on the television 14. The memory 142 also provides instructions that prepare the proximate wireless-enabled interactive programmable device 32 for motion-based commands. In one implementation, the instructions furnish an icon on a touch screen display associated with the proximate wireless-enabled interactive programmable device 32. The icon communicates to a user that the wireless-enabled interactive programmable device 32 is prepared for motion-based commands.

With respect to controlling the television 14, the processor-executable instructions cause the processor to receive and process at least partially processed trajectory data, which is a representation of motion of the proximate wireless-enabled interactive programmable device 32, from the proximate wireless-enabled interactive programmable device. The processor 140 is then caused to evaluate the processed trajectory data to assign a meaning to the motion of the proximate wireless-enabled interactive programmable device 32. Responsive to evaluating the processed trajectory data, a command signal is generated that provides remote control functionality to the television.

With respect to importing content from the proximate wireless-enabled interactive programmable device 32, the memory 142 includes processor-executable instructions that, when executed, cause the processor 140 to respond to evaluating the processed trajectory data, import content from the proximate wireless-enabled interactive programmable device 32 and reformat the imported content such that the television output forwards a fully tuned signal including the imported content to the television 14. The fully tuned signal includes the imported content and provides an upstream parallel experience on the television 14 related to the content on the proximate wireless-enabled interactive programmable device 32.

With respect to amenity control, the memory 142 includes processor-executable instructions that, when executed, cause the processor to respond to evaluating the processed trajectory data, and send a command to the particular amenity. A configuration profile is associated with the memory 142 and processor-executable instructions that enables the set-top box 12 to control multiple proximate amenities related to a user's stay in a lodging establishment in a multi-room environment, including the particular amenity to be controlled. The configuration profile, for each amenity of the plurality of amenities, includes instructions for virtual buttons on a touch screen display, and instructions for associating virtual remote control functionality input instructions from the touch screen display with commands. The configuration profile, for each amenity of the plurality of amenities, includes instructions for virtual buttons on a touch screen display, and instructions for associating virtual remote control functionality input instructions received as the spoken sequence of words from the proximate wireless-enabled interactive programmable device with commands.

Figure 4:
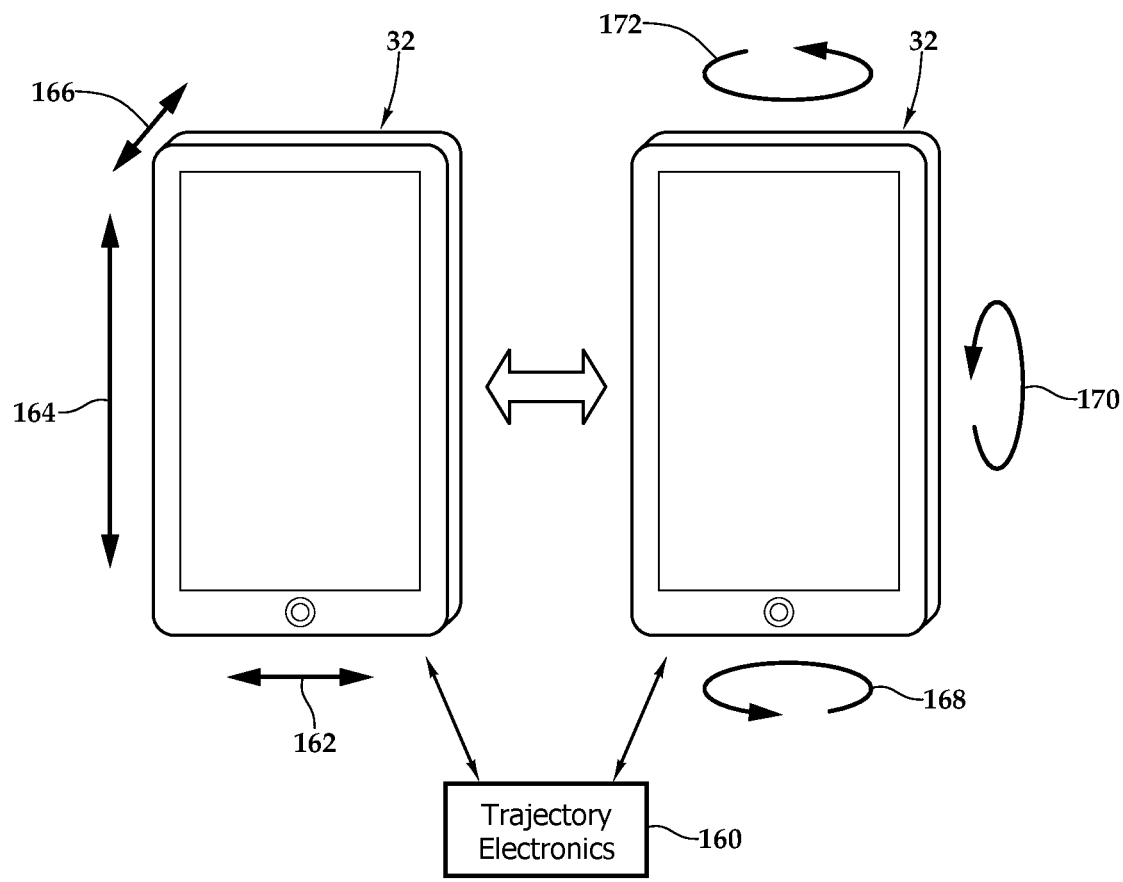
FIG. 4 is a hybrid-schematic-functional block diagram depicting one embodiment of a motion processing unit.

Referring now to FIG. 4, one embodiment of a motion processing unit is depicted as trajectory electronics 160, in which components of the motion processing unit are integrated in a single package, e.g., through wafer-scale integration that may involve utilization of MEMS sensor wafers and an electronics wafer. In one implementation, the trajectory electronics 160 can measure at least one axis of acceleration and at least two axes of rotation. As depicted, axes of acceleration 162, 164, 166 are measured by a three-axis accelerometer and axes of rotation 168, 170, 172 are measured by a three-axis gyroscope to provide six axes of sensing. More specifically, in one implementation, the three-axis accelerometer and the three-axis gyroscope are integrated onto the MEMS sensor wafer, and the corresponding electronics are integrated onto the electronics wafer, which are bonded to each other.

Figure 5:
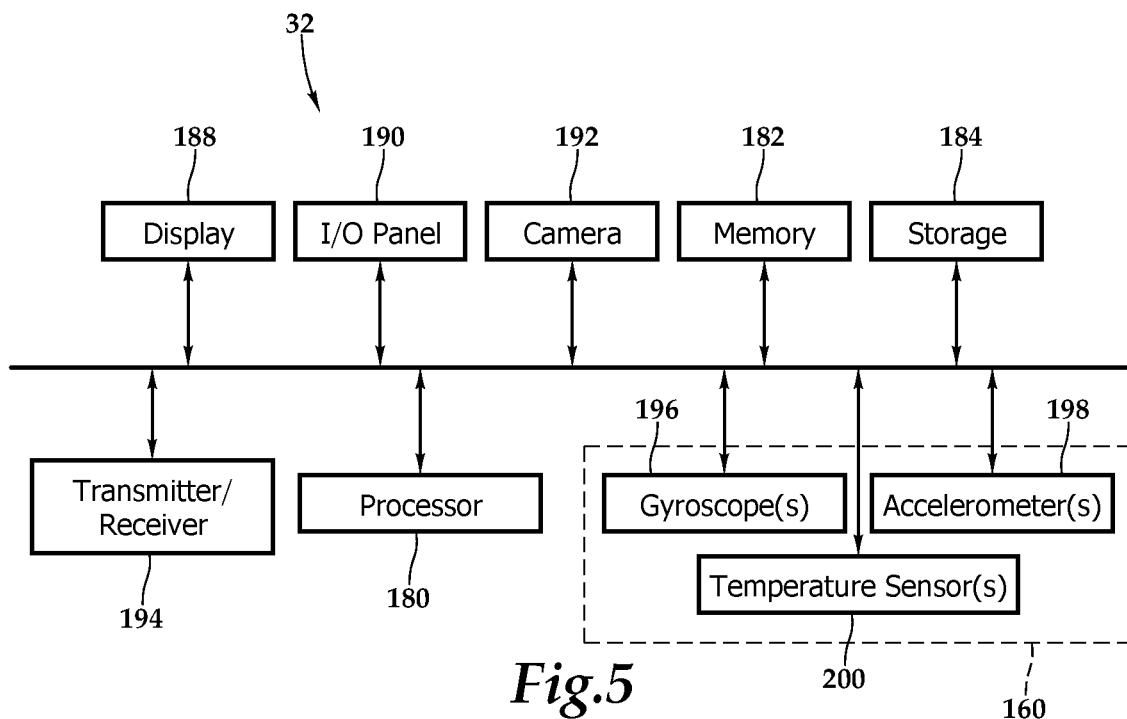
FIG. 5 a functional block diagram depicting one embodiment of a proximate wireless-enabled interactive programmable device presented in FIG. 1A.

Referring to FIG. 5, in one embodiment, the proximate wireless-enabled interactive programmable device 32 may include a processor 180, memory 182, and storage 184, interconnected by a bus architecture 186 within a mounting architecture. Also mounted to the bus architecture 186 is a display 188, an I/O panel 190, a camera 192, a transmitter/receiver 194, and the trajectory electronics 160, which include gyroscopes 196, accelerometers 198, and temperature sensors 200. The components of the proximate wireless-enabled interactive programmable device 32 provide interactive and to some degree autonomous operation. The gyroscopes 196 monitor and measure rotation and may include rotation-based gyroscopes; electronic, microchip-packaged MEMS gyroscopes of the type found in consumer electronics devices; solid-state ring lasers; fiber optic gyroscopes; or extremely sensitive quantum gyroscopes, for example. The accelerometers 198 measure proper acceleration and the temperature sensors 200 measure temperature or a temperature gradient and, in particular, a physical change such as user contact that drives an increase in temperature.

According to various embodiments, the motion sensors of the proximate wireless-enabled interactive programmable device 32 may be used to control selection from a set of elements displayed on the television screen 18 of the television 14 or the display 188 of the proximate wireless-enabled interactive programmable device 32, such as a set of icons (whether displayed as a two dimensional array, in a three dimensional structure, or in any other manner capable of presenting data for user review or interaction), a menu containing a list of items, or a set of image thumbnails, or any other elements that can be displayed for user review or interaction. The selection of other similar sets of discrete elements may also be controlled using the features described herein. Displayed objects or areas of a variety of shapes and configurations can be selected as elements, including 2-D objects or 3-D objects displayed on a 2-D display screen. Additionally, the motion sensors of the proximate wireless-enabled interactive programmable device may be used in place of a remote control.

Figure 6:
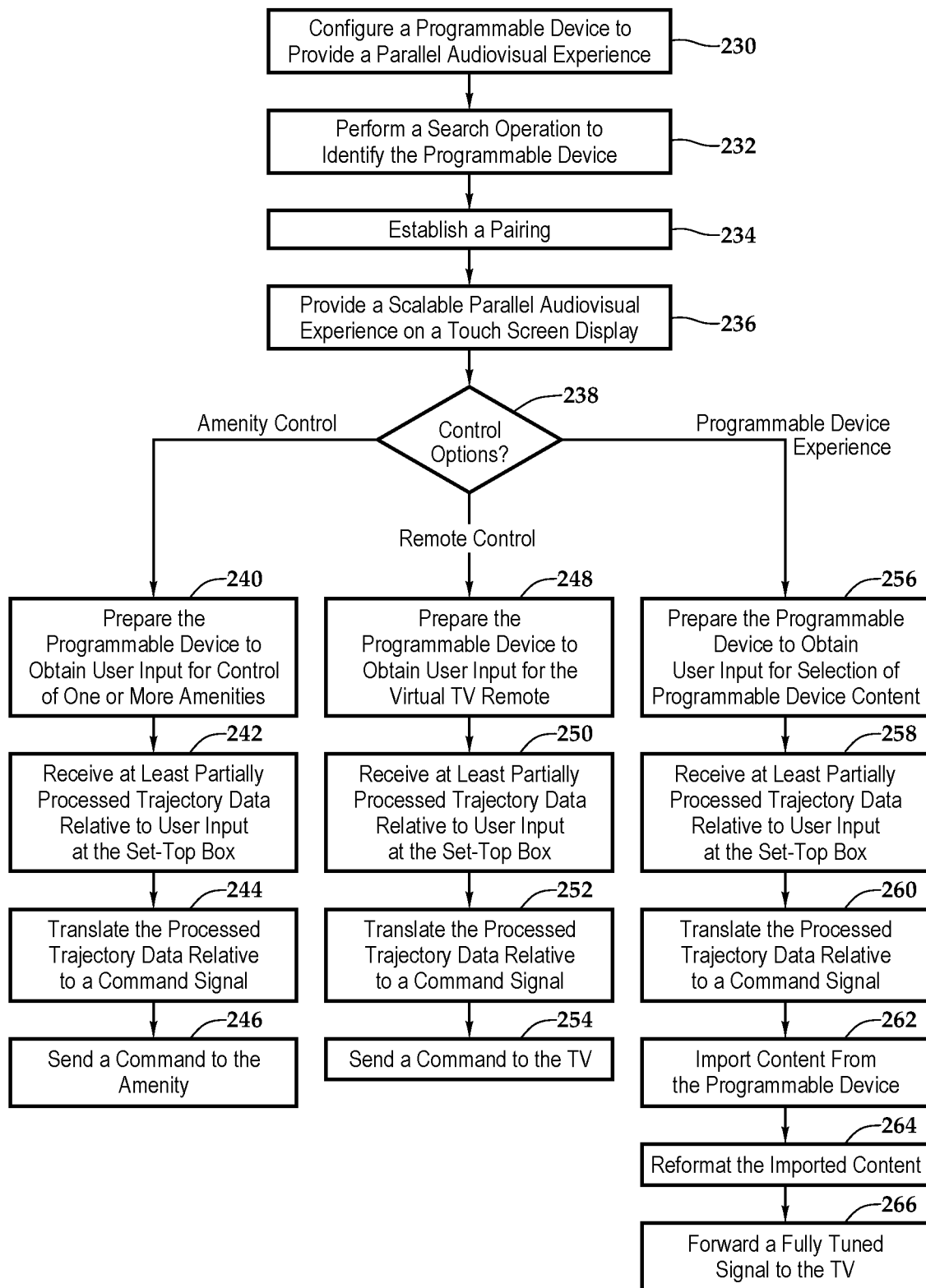
FIG. 6 is a flow chart depicting one embodiment of a method for providing a set-top box having enhanced content according to the teachings presented herein.

FIG. 6 depicts one embodiment of a method for providing a remote control device, according to the teachings presented herein. At block 230, the proximate wireless-enabled interactive programmable device is configured to provide a parallel audiovisual experience. In one implementation, this may involve using an existing application on the programmable device, such as a browser, or downloading a new application. At block 232, a search, which may be active or passive, is performed by the set-top box to identify a physically proximate programmable device in the multi-room environment. At block 234, a pairing is established prior to a scalable parallel audiovisual experience being provided at block 236 on the touch screen display of the programmable device. The audiovisual experience is parallel to the television experience being provided by the set-top box. As noted by block 236, this experience may include providing virtual buttons integrated within the audiovisual experience or two or more panels within the touch screen display showing the television experience and one or more virtual remote controls.

Referring to decision block 238, as previously discussed, the virtual remote controls and buttons each correspond to amenities under the control of the set-top box, remote control of the television, or importing content from the proximate wireless-enabled interactive programmable device to the television. With respect to control of amenities, at block 240, instructions are provided that prepare the proximate wireless-enabled interactive programmable device for motion-based commands. In one implementation, the instructions furnish an icon on a touch screen display associated with the proximate wireless-enabled interactive programmable device. The icon communicates to a user that the wireless-enabled interactive programmable device is prepared for motion-based commands. At block 242, the set-top box receives and processes at least partially processed trajectory data, which is a representation of motion of the proximate wireless-enabled interactive programmable device, from the proximate wireless-enabled interactive programmable device. At block 244, the processed trajectory data is processed and translated to assign a meaning to the motion of the proximate wireless-enabled interactive programmable device. At block 246, responsive to evaluating the processed trajectory data, a command signal is generated that sends a command to the amenity.

Returning to decision block 238, with respect to remote control of the television, at block 248, instructions are provided that prepare the proximate wireless-enabled interactive programmable device for motion-based commands. In one implementation, the instructions furnish an icon on a touch screen display associated with the proximate wireless-enabled interactive programmable device. The icon communicates to a user that the wireless-enabled interactive programmable device is prepared for motion-based commands that will control the television. At block 250, the set-top box receives and processes at least partially processed trajectory data, which is a representation of motion of the proximate wireless-enabled interactive programmable device, from the proximate wireless-enabled interactive programmable device. At block 252, the processed trajectory data is processed and translated to assign a meaning to the motion of the proximate wireless-enabled interactive programmable device. At block 254, the command signal is sent to the television.

Returning now to decision block 238 and the importation of content from the proximate wireless-enabled interactive programmable device, at block 256, instructions are provided that prepare the proximate wireless-enabled interactive programmable device for motion-based commands. In one implementation, the instructions furnish an icon on a touch screen display associated with the proximate wireless-enabled interactive programmable device. The icon communicates to a user that the wireless-enabled interactive programmable device is prepared for motion-based commands. At block 258, the set-top box receives and processes at least partially processed trajectory data, which is a representation of motion of the proximate wireless-enabled interactive programmable device, from the proximate wireless-enabled interactive programmable device. At block 260, the processed trajectory data is processed and translated to assign a meaning to the motion of the proximate wireless-enabled interactive programmable device. At block 262, responsive to evaluating the processed trajectory data, content is imported from the proximate wireless-enabled interactive programmable device. At block 264, imported content is reformatted such that the television output forwards a fully tuned signal including the imported content to the television at block 266. As discussed, the fully tuned signal including the imported content provides an upstream parallel experience on the television related to the content on the proximate wireless-enabled interactive programmable device.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
a housing securing a television input, a television output, a processor, memory, and storage therein;
a busing architecture communicatively interconnecting the television input, the television output, the processor, the memory, and the storage;
a wireless transceiver associated with the housing and coupled to the busing architecture, the wireless transceiver operable to communicate with a non-remote control proximate wireless-enabled interactive programmable device;
the television input configured to receive a source signal from an external source;
the television output configured to forward a fully tuned signal to a television; and
the memory accessible to the processor, the memory including processor-executable instructions that, when executed, cause the processor to:
establish a pairing between the non-remote control proximate wireless-enabled interactive programmable device and the set-top box,
receive and process at least partially processed trajectory data from the non-remote control proximate wireless-enabled interactive programmable device, the at least partially processed trajectory data being representations of motion of the non-remote control proximate wireless-enabled interactive programmable device,
evaluate the at least partially processed trajectory data to assign a meaning to the motion of the non-remote control proximate wireless-enabled interactive programmable device,
responsive to evaluating the at least partially processed trajectory data, generate a command signal to enable the non-remote control proximate wireless-enabled interactive programmable device to have virtual remote control functionality, and
send the command signal to the television;
a configuration profile associated with the memory and processor-executable instructions that enables the set-top box to control a plurality of proximate amenities in a multi-room environment, the plurality of proximate amenities including a particular amenity, the plurality of proximate amenities being associated with a user's stay in the lodging environment; and
wherein the memory includes processor-executable instructions that, when executed cause the processor to:
provide instructions for icons on a touch screen display associated with the non-remote control proximate wireless-enabled interactive handheld device, the icons being associated with the particular amenity,
receive and process the at least partially processed trajectory data from the non-remote control proximate wireless-enabled interactive handheld device, and
responsive to processing the at least partially processed trajectory data, send a command to the particular amenity.

2. The set-top box as recited in claim 1, wherein the housing further comprises a housing-dongle combination securing the television input, the television output, the processor, the memory, the storage, and the wireless transceiver therewith.

3. The set-top box as recited in claim 2, wherein the processor and the memory are distributed through the housing-dongle combination.

4. The set-top box as recited in claim 1, wherein the wireless transceiver is configured to communicate with the non-remote control proximate wireless-enabled interactive programmable device via a standard selected from the group consisting of infrared (IR), 802.11, 3G, 4G, Edge, Wi-Fi, ZigBee, near field communications (NFC), and Bluetooth.

5. The set-top box as recited in claim 1, wherein the wireless transceiver is configured to communicate with the non-remote control proximate wireless-enabled interactive programmable device via a short distance data exchange standard.

6. The set-top box as recited in claim 5, wherein the short distance data exchange standard comprises Bluetooth.

7. The set-top box as recited in claim 1, wherein the transceiver is at least partially internal to the housing.

8. The set-top box as recited in claim 1, wherein the transceiver is at least partially external to the housing.

9. The set-top box as recited in claim 1, wherein the transceiver comprises an antenna.

10. The set-top box as recited in claim 1, wherein the non-remote control proximate wireless-enabled interactive programmable device comprises a device selected from the group consisting of personal computers, laptops, tablet computers, smart phones, and smart watches.

11. The set-top box as recited in claim 1, wherein the non-remote control proximate wireless-enabled interactive programmable device comprises a smart phone.

12. The set-top box as recited in claim 1, wherein the at least partially processed trajectory data further comprises gyroscope-based data.

13. The set-top box as recited in claim 1, wherein the at least partially processed trajectory data further comprises accelerometer-based data.

14. The set-top box as recited in claim 1, wherein the at least partially processed trajectory data further comprises temperature sensor-based data.

15. The set-top box as recited in claim 1, wherein the command signal provides remote control of the television.

16. A set-top box comprising:
a housing securing a television input, a television output, a processor, memory, and storage therein;
a busing architecture communicatively interconnecting the television input, the television output, the processor, the memory, and the storage;
a wireless transceiver associated with the housing and coupled to the busing architecture, the wireless transceiver operable to communicate with a non-remote control proximate wireless-enabled interactive programmable device;
the television input configured to receive a source signal from an external source;
the television output configured to forward a fully tuned signal to a television; and
the memory accessible to the processor, the memory including processor-executable instructions that, when executed, cause the processor to:
establish a pairing between the non-remote control proximate wireless-enabled interactive programmable device and the set-top box,
receive and process the at least partially processed trajectory data from the non-remote control proximate wireless-enabled interactive programmable device, the at least partially processed trajectory data being representations of motion of the non-remote control proximate wireless-enabled interactive programmable device,
evaluate the at least partially processed trajectory data to assign a meaning to the motion of the non-remote control proximate wireless-enabled interactive programmable device,
responsive to evaluating the at least partially processed trajectory data, generate a command signal to enable the non-remote control proximate wireless-enabled interactive programmable device to have virtual remote control functionality,
send the command signal to the television; and
the at least partially processed trajectory data includes data selected from the group consisting of gyroscope-based data, accelerometer-based data, and temperature sensor-based data;
a configuration profile associated with the memory and processor-executable instructions that enables the set-top box to control a plurality of proximate amenities in a multi-room environment, the plurality of proximate amenities including a particular amenity, the plurality of proximate amenities being associated with a user's stay in the lodging environment; and
wherein the memory includes processor-executable instructions that, when executed cause the processor to:
provide instructions for icons on a touch screen display associated with the non-remote control proximate wireless-enabled interactive handheld device, the icons being associated with the particular amenity,
receive and process the at least partially processed trajectory data from the non-remote control proximate wireless-enabled interactive handheld device, and
responsive to processing the at least partially processed trajectory data, send a command to the particular amenity.

17. A set-top box comprising:
a housing securing a television input, a television output, a processor, memory, and storage therein;
a busing architecture communicatively interconnecting the television input, the television output, the processor, the memory, and the storage;
a wireless transceiver associated with the housing and coupled to the busing architecture, the wireless transceiver operable to communicate with a non-remote control proximate wireless-enabled interactive programmable device;
the television input configured to receive a source signal from an external source;
the television output configured to forward a fully tuned signal to a television; and
the memory accessible to the processor, the memory including processor-executable instructions that, when executed, cause the processor to:
establish a pairing between the non-remote control proximate wireless-enabled interactive programmable device and the set-top box,
provide instructions that prepare the non-remote control proximate wireless-enabled interactive programmable device for motion-based commands,
receive and process the at least partially processed trajectory data from the non-remote control proximate wireless-enabled interactive programmable device, the at least partially processed trajectory data being representations of motion of the non-remote control proximate wireless-enabled interactive programmable device,
evaluate processed the at least partially trajectory data to assign a meaning to the motion of the non-remote control proximate wireless-enabled interactive programmable device,
responsive to evaluating the at least partially processed trajectory data, generate a command signal to enable the non-remote control proximate wireless-enabled interactive programmable device to have virtual remote control functionality, and
send the command signal to the television;
wherein the memory includes processor-executable instructions that, when executed cause the processor to:
receive and process the at least partially processed trajectory data from the non-remote control proximate wireless-enabled interactive handheld device,
responsive to processing the at least partially processed trajectory data, send a command to a particular amenity; and
a configuration profile associated with the memory and processor-executable instructions that enables the set-top box to control a plurality of proximate amenities in a multi-room environment, the plurality of proximate amenities including the particular amenity, the plurality of proximate amenities being associated with a user's stay in the lodging environment.

18. The set-top box as recited in claim 17, wherein the at least partially processed trajectory data includes data selected from the group consisting of gyroscope-based data, accelerometer-based data, and temperature sensor-based data.

* * * * *